June 28, 1927.
R. Q. DAVIS
1,633,981
FLUID PRESSURE CONTROL FOR POWER TRANSMISSIONS
Filed Jan. 20, 1926
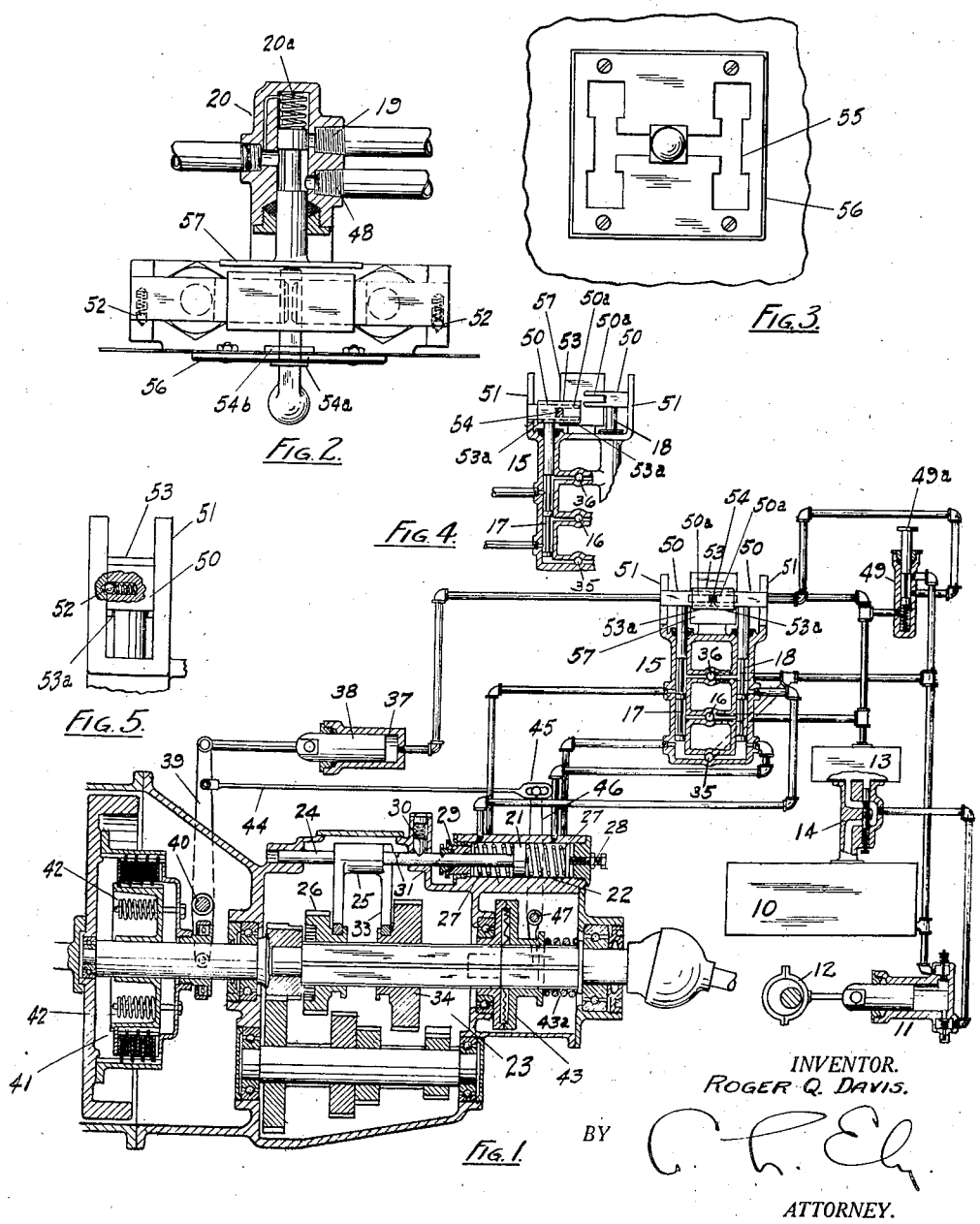
INVENTOR.
ROGER Q. DAVIS.
BY
ATTORNEY.

Patented June 28, 1927.

1,633,981

UNITED STATES PATENT OFFICE.

ROGER Q. DAVIS, OF AKRON, OHIO.

FLUID-PRESSURE CONTROL FOR POWER TRANSMISSIONS.

Application filed January 20, 1926. Serial No. 82,497.

This invention relates to fluid pressure control systems for transmissions for power units such as used in automobiles, and particularly to hydraulic controls therefor.

One object of the invention is to provide an improved fluid pressure control system in which the clutch is automatically released by shifting of the gears, whereby only one manual operation is required for changing from one speed to another or to reverse.

Another object of the invention is to devise an improved control device for operation of a fluid pressure system such as described above.

Another object is to provide an independent clutch control in said system.

The foregoing and other objects are obtained by the system illustrated in the accompanying drawings and described below, it being understood that the invention is not limited to the specific form thereof as shown and described.

Of the accompanying drawings:

Figure 1 is a view of the system more or less diagrammatically shown connected to one form of power transmission;

Figure 2 is a detail plan of the main control device;

Figure 3 is a detail front elevation of a portion of the main control device;

Figure 4 is a detail illustrating the operation thereof; and

Figure 5 is a detail side view, partly in section, of a guide for the gear shift valve stem.

Referring to the drawings, 10 represents a storage tank of suitable capacity for the provision of the pressure fluid which, for universal use, may be of any suitable non-freezing material having a substantially constant viscosity at varying temperatures. Tank 10 is connected to a pump 11 operable in any suitable manner as by an eccentric 12 on any driven shaft of the motor, pump 11 being arranged to deliver the fluid in tank 10 to a pressure tank 13 to which it is connected through an adjustable pressure control valve 14, valve 14 being adapted normally to permit flow of the pressure fluid to tank 13 to maintain a desired pressure, but to be operated by higher pressures to close the inlet to tank 13 and connect the delivery side of the pump 11 to tank 10.

Tank 13 is connected to a main control device indicated generally by the numeral 15, connection being made at 16 to the double-acting gear shift control valves shown at 17 and 18, and connection being made at 19 to a clutch control valve 20.

Valve 18 is operable so as to connect the pressure tank 13 either to one side or the other of a piston 21 in a gear shift operating cylinder 22 which may be mounted on the housing of a transmission indicated generally at 23. Piston 21 is secured on the usual transmission yoke operating rod 24 slidable in the transmission housing and having a yoke 25 thereon engaging one shifting gear 26 of the transmission. Springs 27, 27 are arranged in cylinder 22 on opposite sides of piston 21 to hold gear 26 normally in neutral position, the springs 27 being adjustable for this purpose by means of a screw 28 threaded in one end of cylinder 22 and a nut 29 threaded into the other. The usual spring pressed detent 30 is arranged to engage notches 31, 31 in rod 24 to hold gear 26 in its shifted position.

Valve 17 is arranged to connect the pressure tank 13 to a second cylinder (not shown) similar in every respect to cylinder 22 and in the form shown in Figure 1 mounted to the rear of cylinder 22 so as to operate the other gear shifting rod (not shown) on which yoke 33 is mounted, yoke 33 being connected to shifting gear 34. It will be understood that a detent similar to detent 30 is operable on the shifting rod for gear 34 and also that neutral position of said gear will be controlled by adjustable springs similar to springs 27.

Both ends of cylinder 22 and the second gear shifting cylinder (not shown) are drained when valves 17 and 18 are closed by connecting two branch drain pipes at 35 and 36 to the valves, which pipes are connected to storage tank 10.

Clutch-operating valve 20 is connected to a cylinder 37 having a piston 38 therein for operating a clutch lever 39 pivoted at 40 on the transmission 23 and connected to clutch 41 to release it against the action of its springs 42, 42. A second clutch 43 may be provided to completely disconnect the transmission from the driving and driven members. This, however, is not essential to the operation of the system. If clutch 43 is employed, connecting rod 44 is secured to lever 39 and has a lost-motion connection at 45 to a lever 46 pivoted at 47 and arranged to release clutch 43 against the action of its spring 43ª, the lost-motion connection providing for a release or engagement of the clutches in sequence, the main clutch being released first and engaged last.

The cylinder 37 is drained through valve 20 by a connection at 48 leading to an independent clutch control valve 49 which is normally connected to the main drain to the storage receptacle 10, but which is adapted to connect the drain 48 from valve 20 with the pressure tank 13 and thus release the clutch by supplying pressure through valve 20 independent of the functioning of the valve 20.

Control of the gear shifting valves is effected by means of non-circular T-heads 50, 50 on the valve operating rods which are guided by upwardly extending U brackets 51, 51 mounted on the valve cylinders, the extreme ends of the heads of the T's extending between the arms of the brackets and having spring pressed detents 52 therein for normally holding the valves 17 or 18 in closed position. The inner ends of T-heads 50 normally project into a shiftable block 53 to hold both valves in a neutral position. Block 53 is, however, shiftable so that it may be moved off of one T-head entirely onto the other (Figure 4), it being slotted at 53ª, 53ª to clear the valve stem, whereby a vertical movement of block 53 up or down will be effective to operate a valve 17 or 18 independently of each other to establish pressure against one side or the other of a gear shifting piston, such as 21.

Shifting of block 53 as described above, may be effected by slidably fitting a manually operable rod 54 therein, T-heads 50 being slotted at 50ª, 50ª to permit shifting of the block with the rod 54 extending therethrough and across the bore into which the T-heads project. Rod 54 is also extended through an H-shaped slot 55 in a plate 56 so that the direction of movement of block 53 is determined by the slotted plate. The plate 56 is so arranged that the center of the H slot is aligned with the neutral position of block 53. Rod 54 has a block 54ª thereon of such size and shape (square as here shown) that it will not fit in the portions of slot 55 except at the center of the bridge and at the four ends of the H which are of such size and shape (square) that block 54ª will fit therein. Rod 54 has a flange 54ᵇ thereon, preventing forcing or pulling of the rod forwardly to withdraw it from block 53 when at the center or four corners of the H-slot, 55.

Rod 54 is also adapted to control valve 20 and to this end projects through block 53 into engagement with a plate 57 formed on the valve stem and of such area that rod 54 will always ride on its surface in its movements to the various positions in the H-shaped slot. A spring 20ª normally tends to keep valve 20 closed, the valve being adapted to be opened against the action of spring 20ª by the inward thrust of rod 54 when block 54ª is disengaged from the squared portions in the H-shaped slot to effect a speed change.

Control of the independent clutch operating valve 49 is preferably effected by a foot pedal 49ª connected to the valve steam.

In practice, the control unit 15 is mounted at a convenient place which, in an automobile, would be on the dash or on a bracket adjacent the steering wheel.

The operation of an automobile containing the control system is as follows:

Rod 54 is positioned at the center of the H-shaped slot 55 thus engaging block 53 with both T-heads 50 and gears 26 and 34 being held in neutral by springs 27 or similar springs. The motor is then started.

Shifting into low gear is accomplished by depressing rod 54 to remove block 54ª from the central position against the action of spring 20ª, which action opens valve 20, causing operation of piston 38 to release the clutch. Rod 54 is then moved to the left on the bridge of the H-slot, bearing of the rod on plate 57 all the while holding the clutch released. This moves block 53 off of the right T-head 50 so that block 53 is now entirely supported on the left T-head. Rod 54 is then moved down to the bottom squared portion of the left member of the H, whereupon pressure of spring 20ª causes block 54ª to snap into said squared portion, the downward movement of the left T-head operating valve 17 to connect pressure to the right end of the rear gear shifting cylinder (not shown), thus shifting gear 34 into low. Simultaneously valve 20 is closed and connects the clutch operating cylinder 37 to the drain whereby the clutch becomes engaged. Movement of the right T-head accidentally is prevented by detent 52.

To shift into second, rod 54 is depressed, moved upwardly to the bridge of the H, moved across the bridge to the right member of the H, and finally moved upwardly until block 54ª snaps into the upper right squared portion of slot 55. This will release the clutch throughout movement of the rod 54 and will first return left T-head 50 to neutral position, then move block 53 from the left T-head onto the right T-head and finally will move the right T-head upwardly, opening the right valve 18 to connect pressure to the left of piston 21, thus engaging gear 26 in second.

In shifting from second to high, rod 54 will be depressed and then moved to the bottom right-hand end of the H slot to actuate valve 18 to its other extreme position, cutting off pressure to the left of piston 21 and connecting pressure to the right thereof, clutch 41 being released until block 54ª snaps into the lower right squared portion as will be understood.

Reverse is obtained by depressing and shifting rod 54 into the upper left hand squared portion, the various operations of first returning valve 18 to neutral position, disengaging the right T-head 50 and engaging the left T-head 50 and finally establishing pressure onto the left of the rear gear shifting cylinder (not shown) all being performed as will be understood in the sequence named, the clutch being automatically released all during the shifting action and automatically engaged at the end thereof.

When it is desired to release the clutch independently of shifting the gears, foot pedal 49ᵃ is depressed to connect pressure to cylinder 37 independently of operation of valve 20.

Modifications of the invention may be resorted to without departing from the spirit thereof or the scope of the appended claims. It will be seen that in the present device only a single control member is required to effect speed changes, no thought being required for operation of the clutch, and that the control can be advantageously accomplished from a point convenient to the driver without the use of the usual gear shifting lever in an obstructing position in the floor of the automobile.

What is claimed is:

1. A fluid pressure control for power transmissions comprising a double acting piston connected to each shiftable gear of the transmission, means normally holding each double acting piston in neutral, a piston connected to the clutch thereof, means normally engaging the clutch, means for providing a supply of fluid pressure, and means for connecting fluid pressure from the supply means to the above pistons, said means comprising double acting valves connected to the double acting pistons, a valve connected to the clutch operating piston, and a single means for operating the valves adapted to operate the clutch valve during the shifting of either one of the double acting valves and the latter in either direction, said means comprising a block slidable into operating engagement with either valve stem of the double acting valves, a rod slidably mounted in the block and operable in engagement with the valve stem of the clutch operating valve, and means for guiding movement of said rod requiring that it shall first be shifted so as to open the clutch operating valve and then be shifted to carry the block into operative engagement with the stem of one operating valve or the other and then be shifted to operate said stem in one direction or another and finally to permit the rod's shifting to permit closing of the clutch operating valve, said means comprising a plate having an H-slot therein, having enlarged portions at the centers and four corners, a block on the rod adapted to fit in the enlarged portions only of said slot, and yielding means tending to urge the block on the rod against said plate to snap said block into said enlarged portions when it becomes aligned therewith.

2. A fluid pressure control for power transmissions comprising a double acting piston connected to each shiftable gear of the transmission, means normally holding each double acting piston in neutral, a piston connected to the clutch thereof, means normally engaging the clutch, means for providing a supply of fluid pressure, and means for connecting fluid pressure from the supply means to the above pistons, said means comprising double acting valves connected to the double acting pistons, a valve connected to the clutch operating piston, and a single means for operating the valves adapted to operate the clutch valve during the shifting of either one of the double acting valves and the latter in either direction, said means comprising a block slidable into operating engagement with either valve stem of the double acting valves, a rod slidably mounted in the block and operable in engagement with the valve stem of the clutch operating valve, and means for guiding movement of said rod requiring that it shall first be shifted so as to open the clutch operating valve and then be shifted to carry the block into operative engagement with the stem of one operating valve or the other and then be shifted to operate said stem in one direction or another and finally to permit the rod's shifting to permit closing of the clutch operating valve.

3. A fluid pressure control for power transmissions comprising a double acting piston connected to each shiftable gear of the transmission, means normally holding each double acting piston in neutral, a piston connected to the clutch thereof, means normally engaging the clutch, means for providing a supply of fluid pressure, and means for connecting fluid pressure from the supply means to the above pistons, said means comprising double acting valves connected to the double acting pistons, a valve connected to the clutch operating piston, and a single means for operating the valves adapted to operate the clutch valve during the shifting of either one of the double acting valves and the latter in either direction.

4. A fluid pressure control for power transmissions comprising a double acting piston connected to each shiftable gear of the transmission, means normally holding each double acting piston in neutral, a piston connected to the clutch thereof, means normally engaging the clutch, means for providing a supply of fluid pressure, and shiftable means for connecting fluid pressure from the supply means to the one side or the other of either gear operating piston and for connecting the supply means to the clutch operating piston during shifting of the gear and disconnecting the supply means therefrom when the gear has been shifted, said means comprising double acting valves connected to the double acting pistons, a valve connected to the clutch operating piston, and a single means for operating the valves adapted to operate the clutch valve during the shifting of either one of the double acting valves and the latter in either direction.

5. A fluid pressure control for power transmissions comprising a double acting piston connected to each shiftable gear of the transmission, means normally holding each double acting piston in neutral, a piston connected to the clutch thereof, means normally engaging the clutch, means for providing a supply of fluid pressure, and shiftable means for connecting fluid pressure from the supply means to the one side or the other of either gear operating piston and for connecting the supply means to the clutch operating piston during shifting of the gear, said means comprising double acting valves connected to the double acting pistons, a valve connected to the clutch operating piston, and a single means for operating the valves adapted to operate the clutch valve during the shifting of either one of the double acting valves and the latter in either direction.

6. In a fluid pressure control system for power transmissions, means supplying fluid under pressure, double acting pistons connected to each shiftable gear, double acting valves adapted to connect the pressure supply to said pistons on one side or the other of either, and a single means for actuating either valve in either direction, said means comprising an element movable into and away from operative relation on each valve stem and into engagement with both in a neutral position.

7. In a fluid pressure control system for power transmissions, means supplying fluid under pressure, double acting pistons connected to each shiftable gear, double acting valves adapted to connect the pressure supply to said pistons on one side or the other of either, and a single means for actuating either valve in either direction, said means comprising an element movable into and away from operative relation on each valve stem.

8. In a fluid pressure control system for power transmissions including shiftable gears, means supplying fluid under pressure, double acting pistons connected to each shiftable gear, double acting valves adapted to connect the pressure supply to said pistons on one side or the other of either, and a single means for actuating either valve in either direction to connect the pressure supply to the pistons.

9. In a fluid pressure control system for power transmissions, means providing fluid under pressure, double acting pistons connected to each shiftable gear of the transmission, a piston connected to the clutch, double acting valves for connecting the fluid supply to said pistons, and a single means for controlling the valves comprising a member shiftable into operative engagement with one valve stem or the other of the double acting valves, and a member shiftable on the first member for operating the clutch controlling valve.

10. A fluid pressure control for power transmissions comprising a gear-shifting piston connected to a shiftable gear of the transmission, means for normally holding said piston in neutral, a clutch-shifting piston adapted to release the clutch, means providing a supply of fluid pressure, a single means for connecting the supply means to the gear operating piston and for connecting the supply means to the clutch operating piston so as to maintain the clutch released during shifting of the gear, and means operable to supply fluid pressure to said clutch independently of said single means.

ROGER Q. DAVIS.